(12) United States Patent
Richard

(10) Patent No.: US 6,873,084 B2
(45) Date of Patent: Mar. 29, 2005

(54) STATIONARY ARMATURE MACHINE

(76) Inventor: Douglas Odell Richard, 20152 Cypress Ave., Lynwood, IL (US) 60411

( * ) Notice: Subject to any disclaimer, the term of this patent is extended or adjusted under 35 U.S.C. 154(b) by 0 days.

(21) Appl. No.: 10/647,835

(22) Filed: Aug. 25, 2003

(65) Prior Publication Data
US 2005/0046303 A1 Mar. 3, 2005

(51) Int. Cl.$^7$ .............................................. H02K 13/10
(52) U.S. Cl. ...................................................... 310/239
(58) Field of Search ................................. 310/179–180, 310/184, 198, 206–207, 232, 233, 237, 229, 239, 245; 439/21, 27; 200/19.09

(56) References Cited

U.S. PATENT DOCUMENTS 4,843,286 A * 6/1989 Suriano et al. ............. 318/443
5,376,852 A * 12/1994 Kawamura et al. ......... 310/198
6,586,858 B1 * 7/2003 Finkle ........................ 310/233

* cited by examiner

Primary Examiner—Tran Nguyen

(57) ABSTRACT

The Stationary Armature Machine (SAM) comprised of a stationary armature, a stationary commutator affixed to the frame or housing and a rotating field and brushes affixed to a common shaft as a means for mechanical commutation of electrical currents based on Lorentz' force law. SAM's unique stationary armature increases current carrying capacity and heat abatement at low voltages and high rotating speeds without increasing overall physical size relative to BLDC motors. SAM's armature and field structure are arranged in reverse having the armature in a stationary position with a commutation assembly affixed to the machine's housing while said field structure (and brush assembly) rotate at the center of the machine. By making the armature and commutator assembly stationary, the current carrying conductors can be made much larger without being subjected to extreme centrifugal forces at high rotating velocities. SAM is ideally suited for applications that require high torque and power at high rotational speeds in a small inexpensive package.

4 Claims, 13 Drawing Sheets

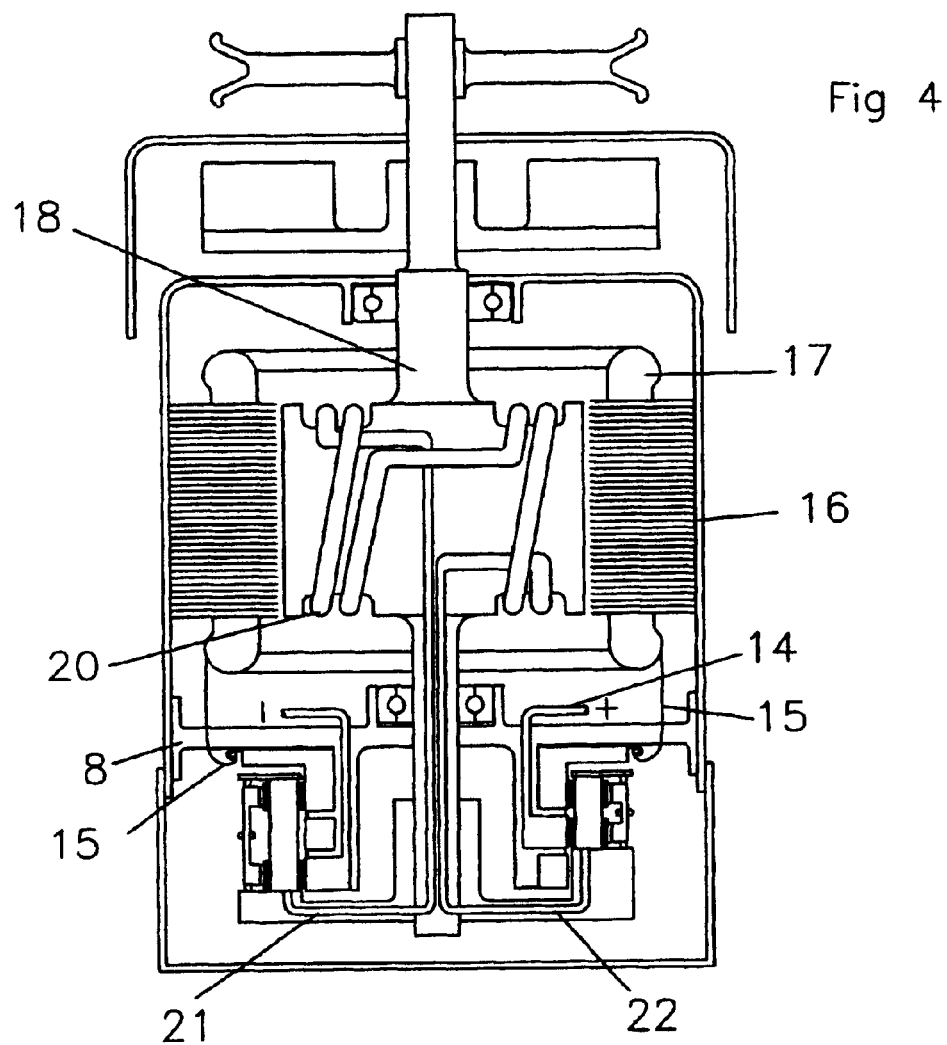
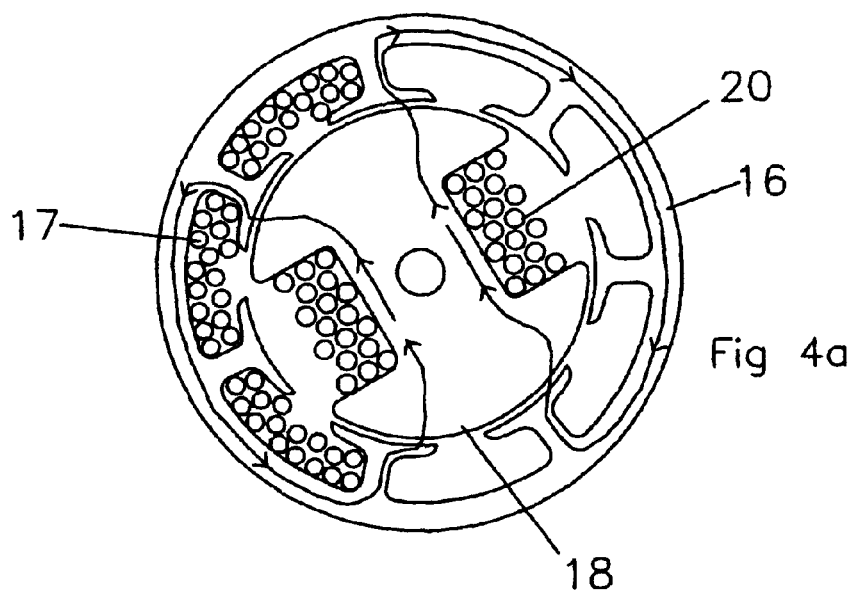
Fig 4
Fig 4a and field coils. FIG.

STATIONARY ARMATURE MACHINE

CROSS REFERENCE TO RELATED APPLICATIONS

U.S. Pat. No. 3,870,914 Mar. 1975 Walker, Alan . . . 310/219
U.S. Pat. No. 4,573,001 Feb. 1986 Lin, Banchien . . . 318/695.

BACKGROUND OF INVENTION

Conventional Brush Type DC Electric Motors have been used for many years in power tools, electric scooters & vehicles, appliances and other assorted machinery. The main parts are comprised of an a field structure, yoke or housing and brush rigging. The armature being the rotating part of the motor consists of a laminated steel core having slots as a means for holding coils of wire electrically connected to a commutator affixed to a common shaft. Electrical current from a power source flows through stationary magnetic field coils and brushes affixed to a housing and through annature windings affixed to a rotor as a means for generating a rotating magnetic field magnetic wave that drives the rotor. This arrangement generates a large amount of heat at the center of the motor having limited means for heat abatement through the air gap, field structure and housing such that direct current brush type motors are much larger than ac motors (and BLDC) of the same power rating. The armature and field structure of conventional brush type dc machines are connected electrically in series, shunt, compound and permanent magnet configurations. Brushless dc (BLDC) motors having a rotating field and stator electrically connected to a multiphase electronic inverter as a means for electronic commutation inducing a rotating magnetic field that drives said rotor. BLDC motors having a stator affixed to said housing for increase thermal abatement operates more efficiently using dc power inverted into ac power by a multi-phase electronic inverter

SUMMARY OF INVENTION

The Stationary Armature Machine (SAW has a stationary armature similar to the BLDC motor, and a stationary commutator affixed to the frame or housing for increased heat abatement. The concept behind SAM is simple: Revere the physical position of the armature and field structure relative to the other by attaching the armature (and commutator) to the housing and the field structure (and brush assembly) to the shaft in a manner similar to BLDC motors. By making the armature (and commutator) stationary, the current carrying conductors can be made much larger as a means for increasing current carrying capacity at low voltages. Because SAM's armature coils are stationary, they are unaffected by centrifugal forces generated by the rotor's high rotating velocities. Heat generated by the armature is easily abated through the housing increasing its ability to transform electrical energy into mechanical energy efficiently. Hybrid vehicles and battery powered household/garden appliances are becoming more assessable with the advent of high energy pant magnets, lithium ion/ NiMH battery technology and high power multiphase inverters. Conventional DC brush type motors are unable to meet the demands of hybrid vehicles and appliances that required large amounts of power and operate at high rotating speeds such as leaf blowers and upright vacuum cleaners because of size, volume or weight constraints. Conventional low voltage high dent dc motor armatures require large conductors that are subjected to tremendous centrifugal forces generated by the high rotating velocities. The rotating armature must be large enough to dissipate heat generated by high currents increasing the overall size relative to Brushless dc motors (BLDC) and Controlled Slip Induction motors (IM). BLDC and IN motors use a "stationary armature" (stator) that requires an external means of excitation such as a dc to ac multiphase (electronic) inverter at great expense. By comparison: (1) SAM does not require closed loop feedback for rotor positioning such as resolvers, encoders or hall-effect sensors; (2) Develops very high starting torque; (3) Low rotor Inductance and inertia when compared to conventional dc motors. SAM uses a unique brush cooling technique to reduce brush/commutator wear and uses a stationary armature as a means for increased power output improved thermal abatement and reduced size similar to the BLDG motor. SAM, unlike BLDC and IM's uses a mechanical rotating brush and stationary commutator as a means for excitation instead of an external multiphase inverter increasing its cost effectiveness. Battery powered high output (1000 watts) upright vacuum cleaners and leaf blowers powered by SAM take advantage of its stationary armature and large current carrying conductors to keep the overall size comparable to that of BLDC technology. Applications include: 1) Power tools & appliances (120 vac & dc battery powered)— up to 1500 watts; 2) Electric scooters & vehicles (battery powered) up to 200 Kilowatts; 3) Uninterruptible Power Supply (UPS) prime mover up to 2,000 Kilowatts; 4) Traction drives for heavy machinery up to 20,000 Kilowatts; 5) Power generators & motors up to 60,000 kilowatts and motor/generator combinations for use in hybrid vehicles up to 500 Kilowatts.

BRIEF DESCRIPTION OF THE DRAWINGS

FIG. 4 shows the side view of the stationary armature machine in a shunt wound configuration.

DETAILED DESCRIPTION

Figure 1:
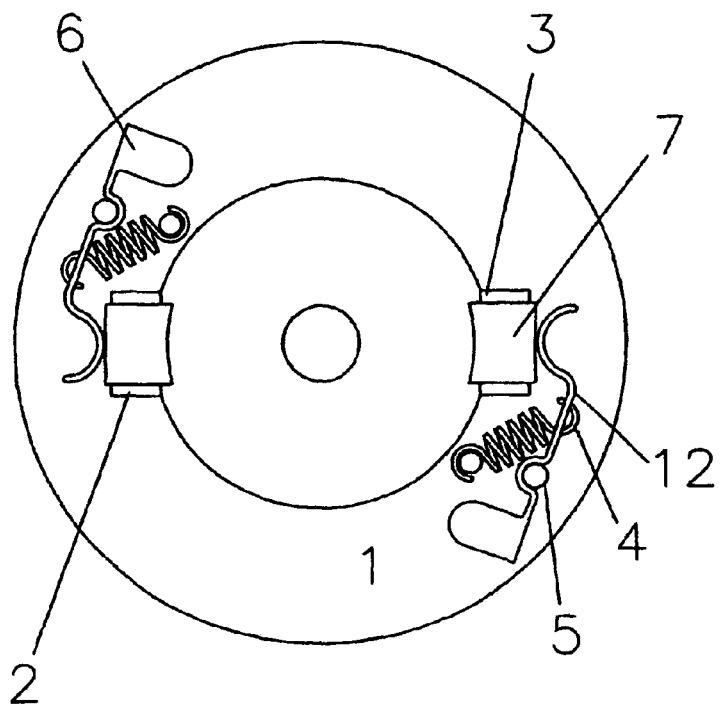
FIG. 1 shows the front view of the rotating brush assembly in a 2-pole configuration.
Figures 2, 2A:
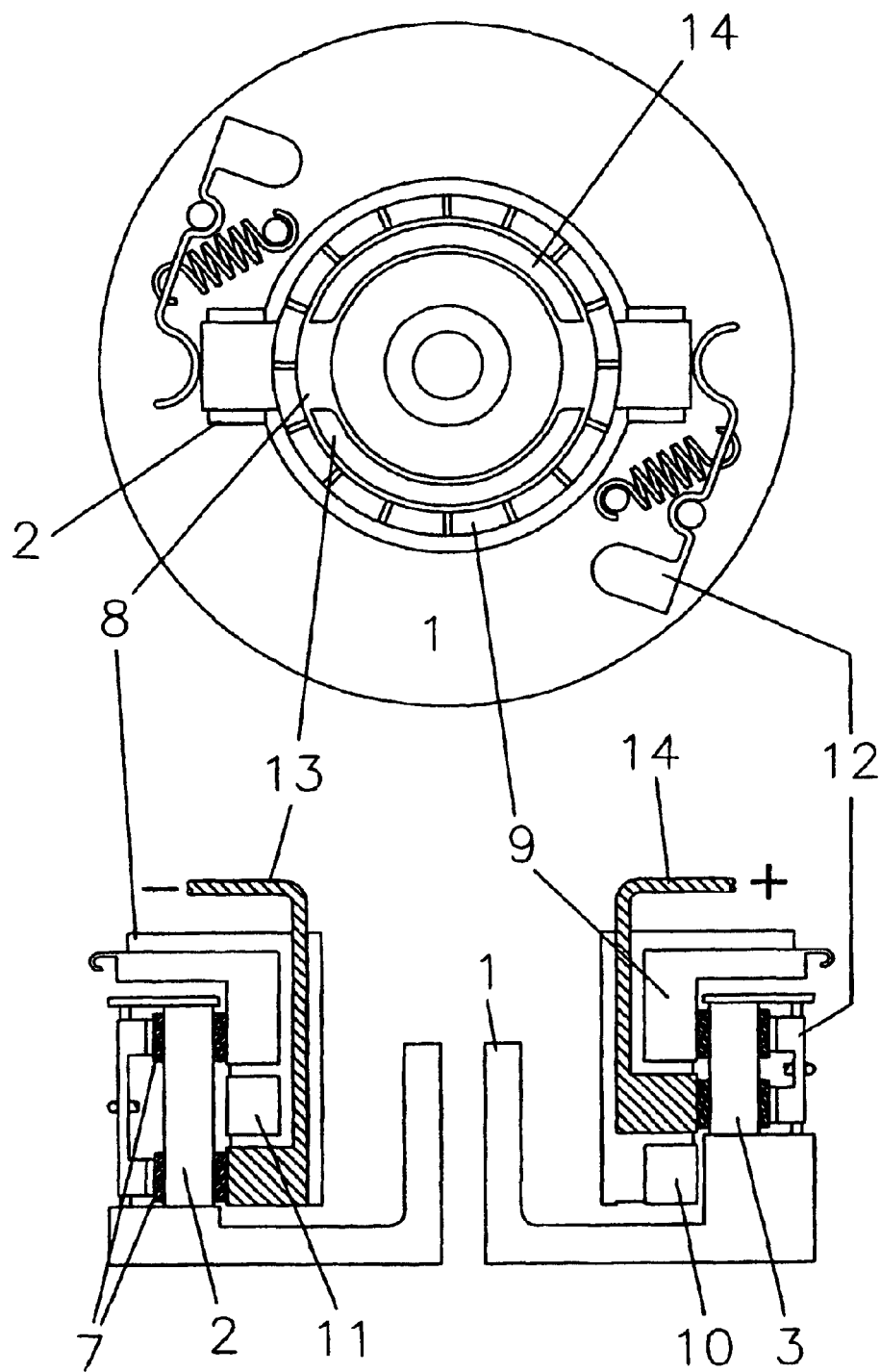
FIG. 2 shows the front view of the stationary commutator, slip rings and rotating brush assembly.
Figure 3:
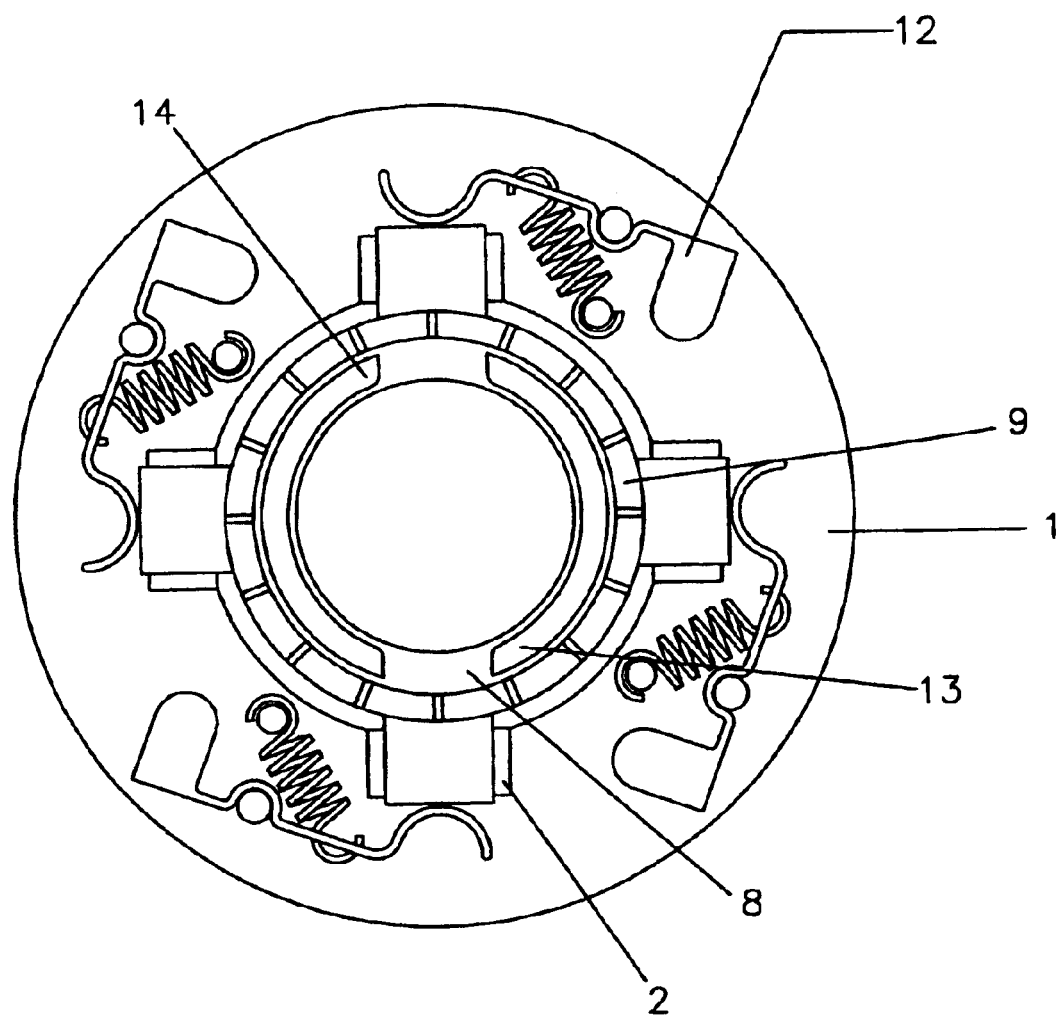
FIG. 3 shows the front view of the rotating brush assembly in a 4-pole configuration.

FIG. 1 shows the front view of a 2-pole rotating brush assembly as a means for conducting electric current from a power supply to the armature windings and field coils. FIG. 1-1 shows the front view of the rotating brush assembly housing capable of providing physical support and electrical isolation of the attached components. FIG. 1-2 shows a negative polarity copper brush holder attached to FIG. 1-1 as a means for guiding said brush and providing additional electric current shunting capacity. FIG. 1-3 shows a positive polarity copper brush holder as a means for guiding said brush and providing additional electric current shunting capacity.

FIG. 1-4 shows a spring as a means for keeping said brush in contact with said commutator. FIG. 1-5 shows the fulcrum of the brush keeper as a means for supporting said brush keeper and as means for providing a moment opposite that applied from centrifugal forces acting on said brush. FIG. 1-6 shows the counter weight portion of FIG. 1-12 as a means for applying a moment about said fulcrum equal an opposite to that applied by the FIG. 1-7 brush being forced outward by said centrifugal force. FIG. 1-12 shows a conductive brush keeper and shunt as a means for keeping the brush in contact with the stationary commutator during high-speed operation to counteract centrifugal forces acting on said brushes.

Figure 1A:
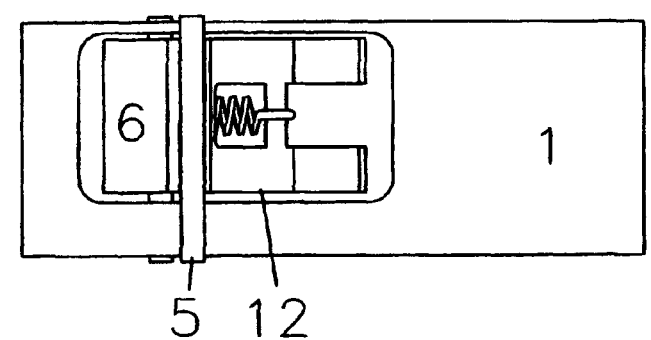
Figure 1B:
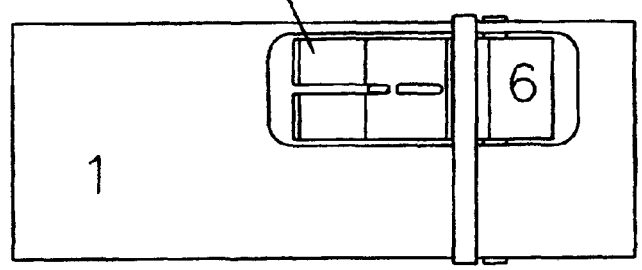
Figure 1C:
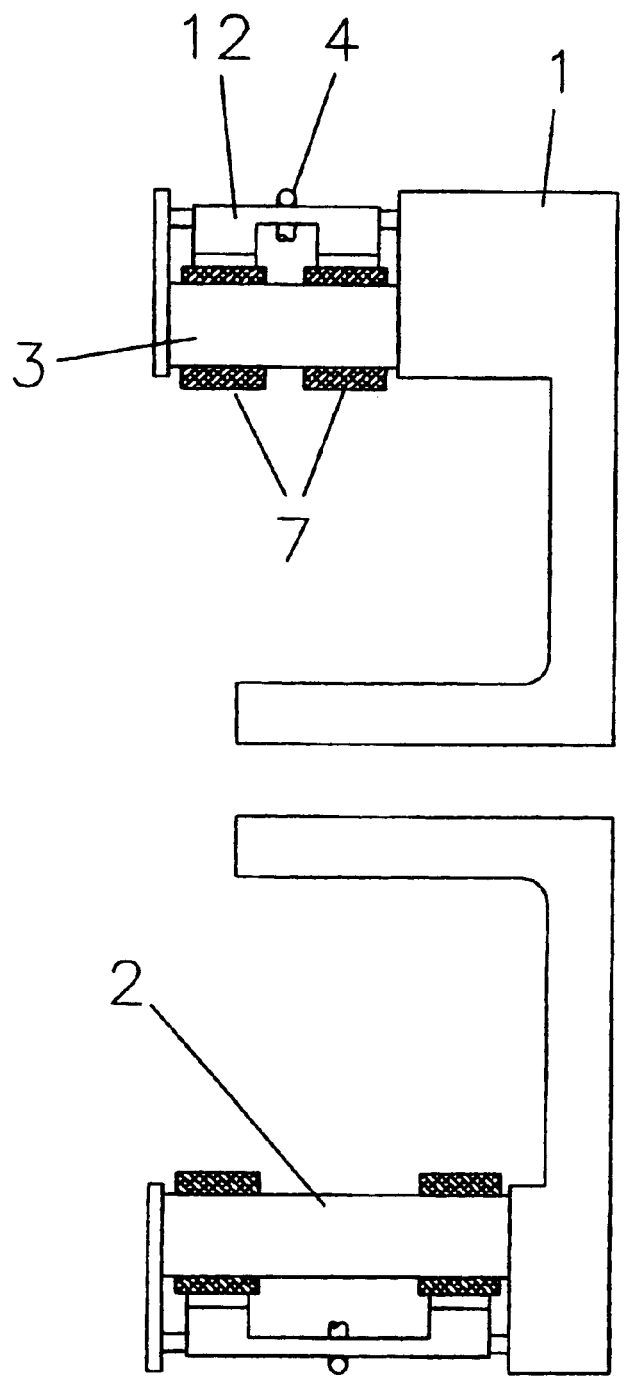

FIGS. 1a and 1b show the bottom and top views of FIG. 1. FIG. 1c shows a cutaway of FIG. 1. FIG. 2 shows the front view of the stationary commutator, slip rings and rotating brush assembly. FIG. 2-8 shows the base of the stationary commutator slip ring assembly as a means for support and electrical insulation between slip rings and commutator segments. FIG. 2-9 shows commutator comprised of segments electrically insulated from each other and electrical connected to individual armature coils. FIGS. 2-10 & 11 shows the negative and positive polarity copper slip rings as a means for conducting current from a power source through said rotating brushes making contact with said stationary commutator as a means for generating a rotating magnetic field driving said rotor. FIGS. 2-13 & 14 show the negative and positive polarity power leads. FIG. 3 shows the front view of a 4 pole variation of the 2 pole rotating brush assembly having brushes arranged 180 electrical degrees apart being physically arranged 90 degrees apart. FIG. 4 shows the side view of the shunt wound stationary armature machine.

FIG. 4-15 shows the lead that connects the one armature coil to one commutator segment. FIG. 4-16 shows the laminated steel armature core being affixed to the machine housing and encompassing said rotor as a means for abating heat generated from copper losses within said armature. FIG. 4-17 shows the armature windings placed inside slots within said core. FIG. 4-18 shows the rotating electromagnetic field structure. FIG. 4-20 shows the field structure winding. FIGS. 4-21 & 22 show the field structure leads as a means for conducting power from the brush holders to the rotating field structure winding. FIG. 4a shows the front view of said motor.

Figure 5:
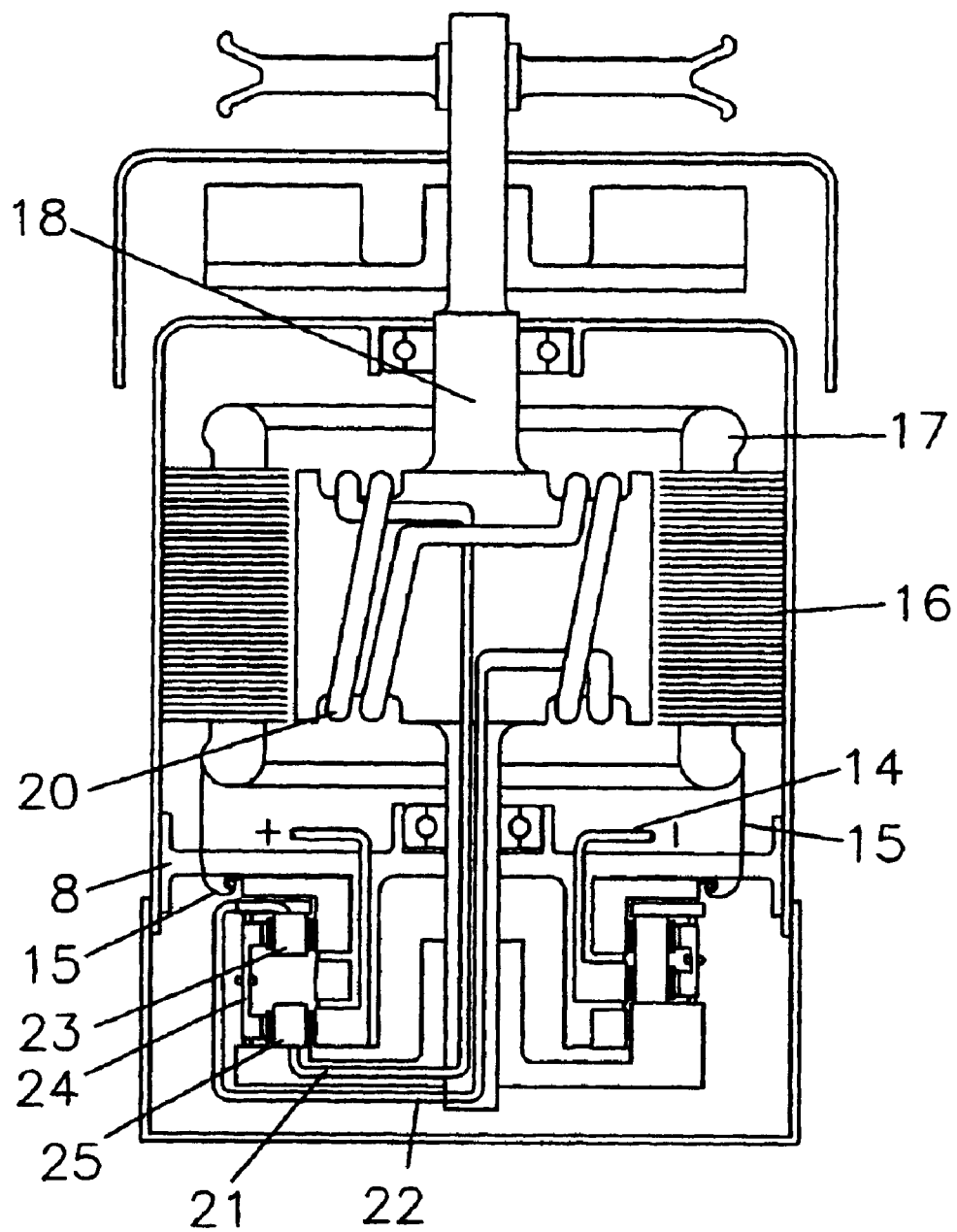
FIG. 5 shows the side view of the stationary armature machine in a series wound configuration.
Figure 6:
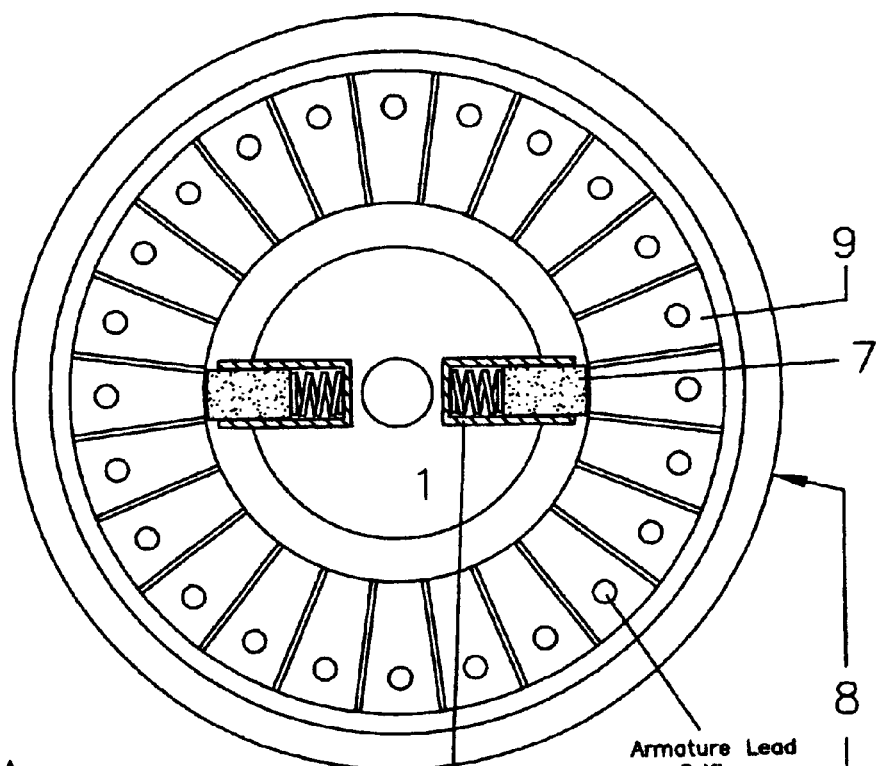
FIG. 6 shows the front view of the internal brush and stationary commutator detail without counterweights.

FIG. 5 shows the side view of a series wound stationary armature machine. FIG. 5-23 shows the lead of a copper brush holder and non-conductive brush keeper FIG. 5-24 being isolated from brush holder FIG. 5-25 as a means for conducting electric current through the rotating field and armature in a series electrical connection. FIG. 5-24 shows a non-conductive brush keeper as a means for isolating the flow of electric current from a power source to the rotor coil via brush assembly FIG. 5-25 returning through brush assembly FIG. 5-23 continuing through said commutator assembly. Electric current flows through said armature to the opposite brush assembly having a shunt brush keeper continuing through the other stationary slip ring and out to the other terminal of said power source. FIG. 6 shows the front view of the stationary commutator having a cylindrical shape and rotating brush assembly whereas the rotating brush assembly contacts the stationary commutator on the inside diameter of said commutator assembly. High-speed rotation induces centrifugal forces that act to force said brushes against the inside diameter of the stationary commutator assembly.

Figure 6A:
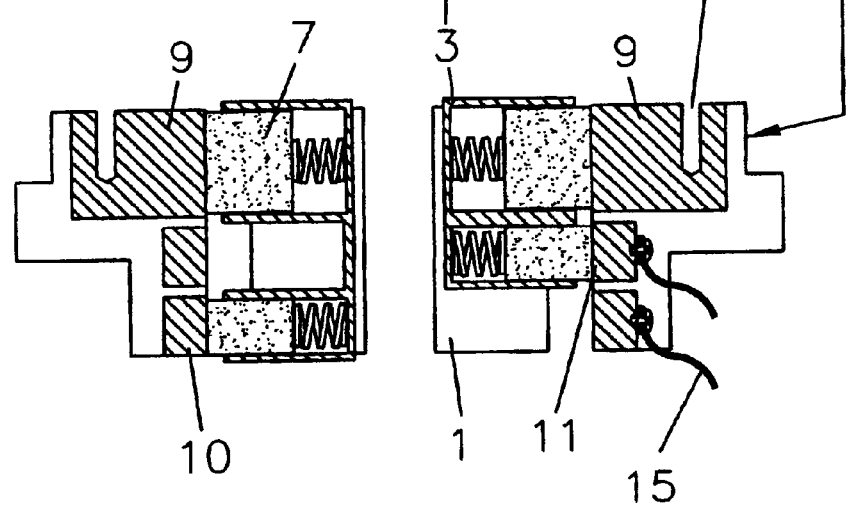
Figure 7:
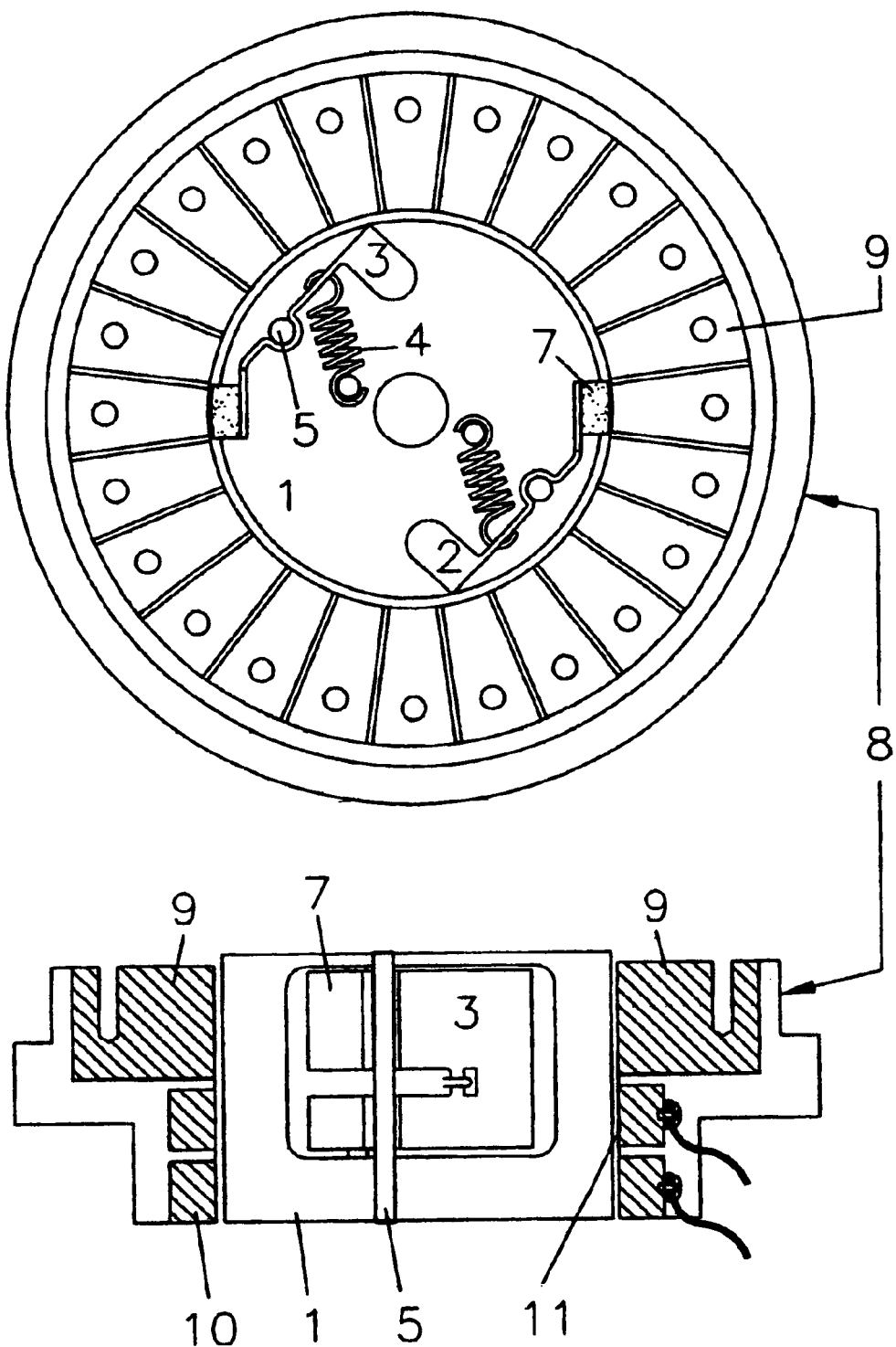
FIG. 7 shows the front view of the internal brush and stationary commutator detail with counterweights.

FIG. 6a show a side view cutaway of FIG. 6. FIG. 7 shows the front view of the stationary commutator and rotating brush assembly having a rotating brush assembly comprised of two brushes permanently affixed a single copper shunt between the armature and slip rings as a means for conducting high electric current at low voltage and high rotating velocities. Wherein FIG. 7-7 brush is attached to brush keeper shunts FIGS. 7-2 & 3. FIG. 8 shows the front view of the radial stationary commutator and brush assembly, wherein the commutator and slip rings are arranged in a concentric pattern having a flat or conical surface as a means for increasing the cross sectional area through which electric current flows.

Figure 8A:
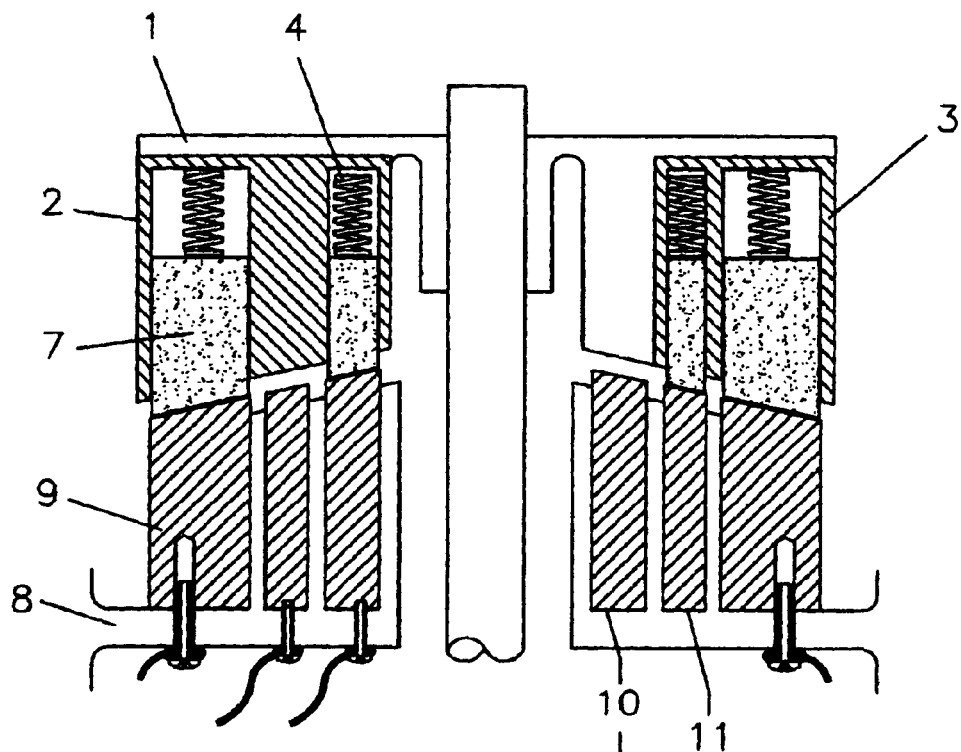
FIG. 8 shows the front view of the radial stationary commutator and brush assembly.
Figure 8:
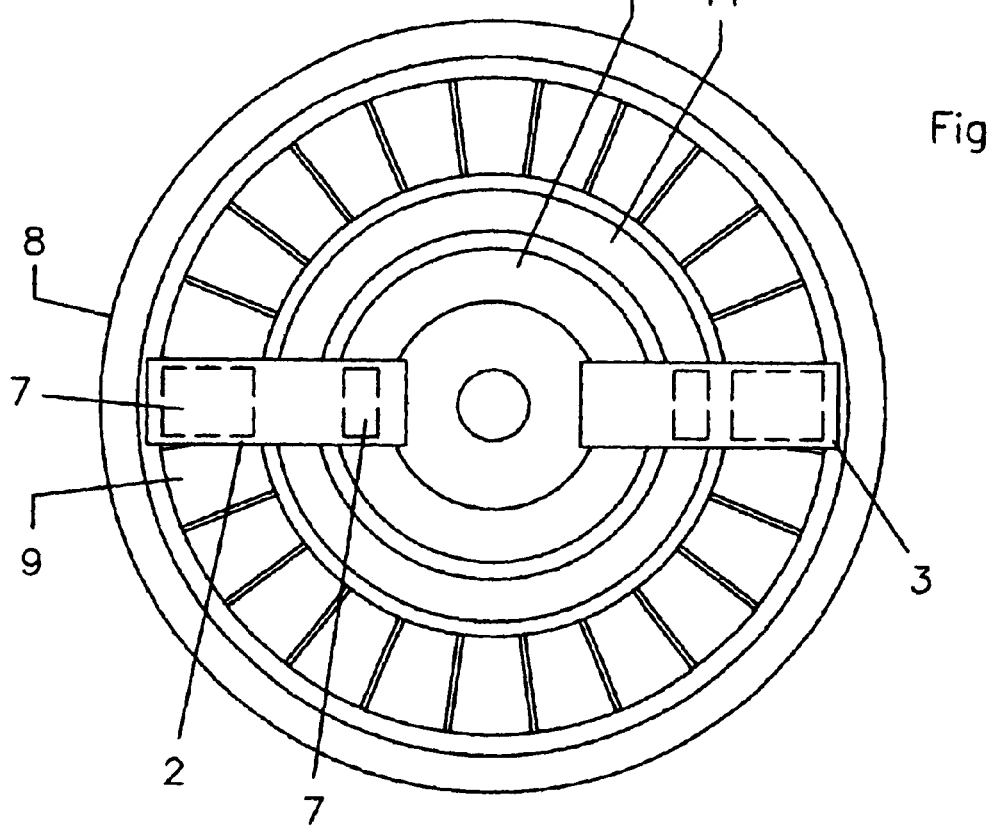
Figure 9:
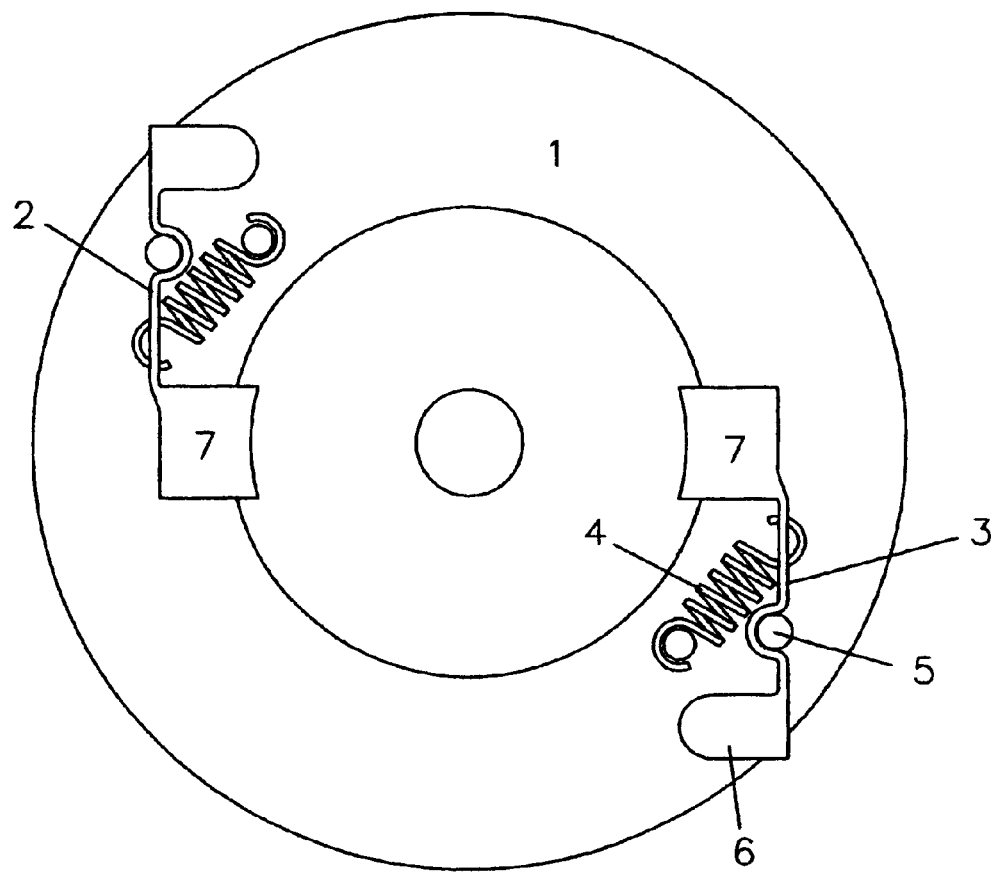
FIG. 9 shows the front view of the external brush assembly with counterweights.
Figure 9A:
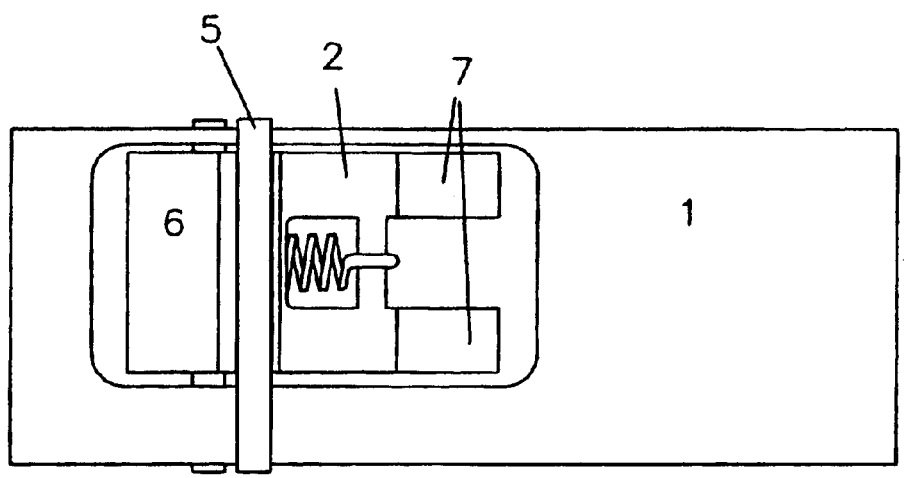

FIG. 8a shows the side view cutaway of FIG. 8. Centrifugal forces acting on the brushes generated by high-speed rotation have little effect on the pressure at the point where the brushes make contact with the said commutator. FIG. 9 shows the rotating brush assembly whereas brush keepers FIGS. 9-2 & 3 and brushes FIG. 9-7 are permanently attached to each other. Centrifugal forces acting on the brushes generated by high speed rotation is counteracted by centrifugal force generated by a counter weight FIG. 9-6 limiting the pressure at the point where the brushes make contact with the said commutator.

Figure 10:
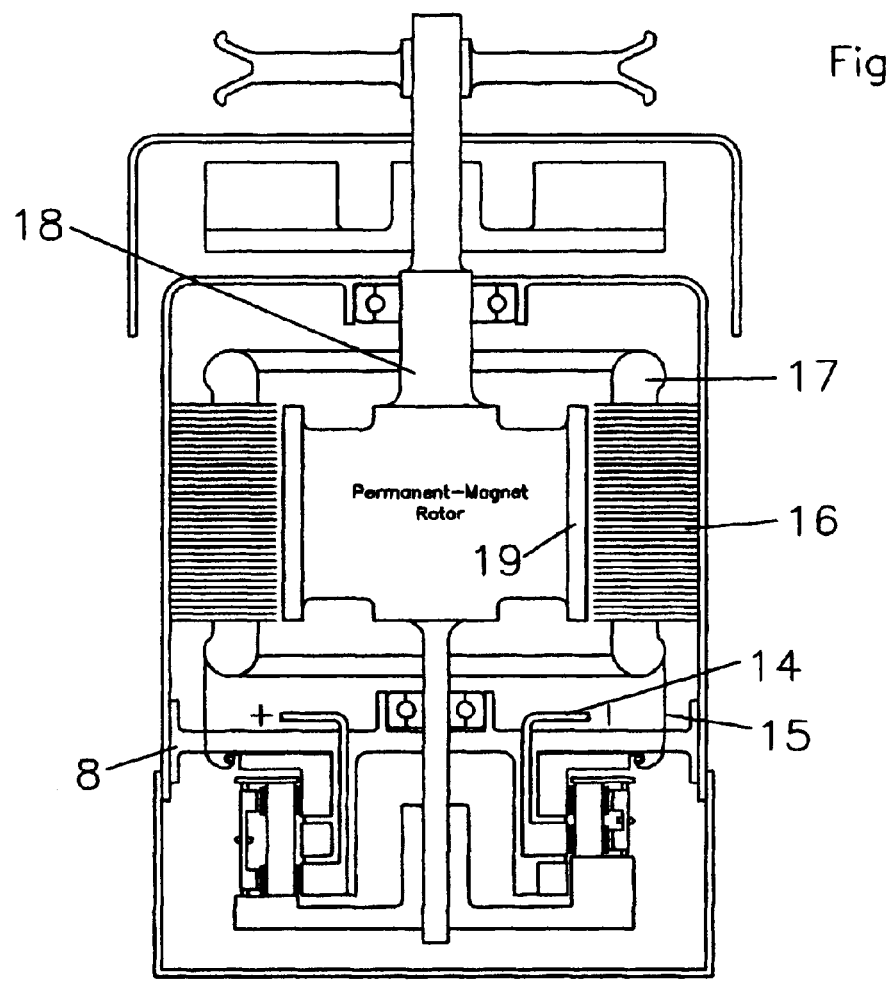
FIG. 10 shows the side view of the stationary armature machine in a permanent magnet configuration.
Figure 10A:
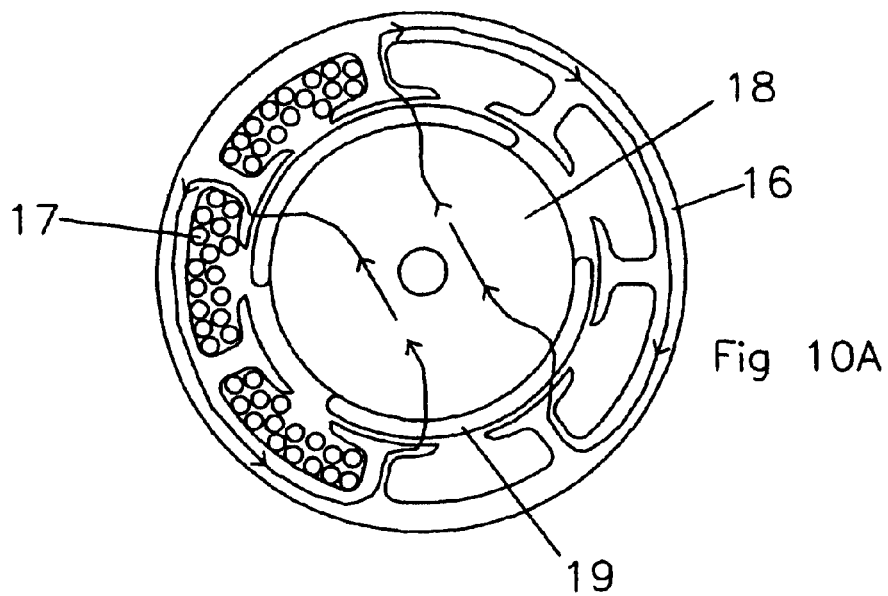
Figure 11:
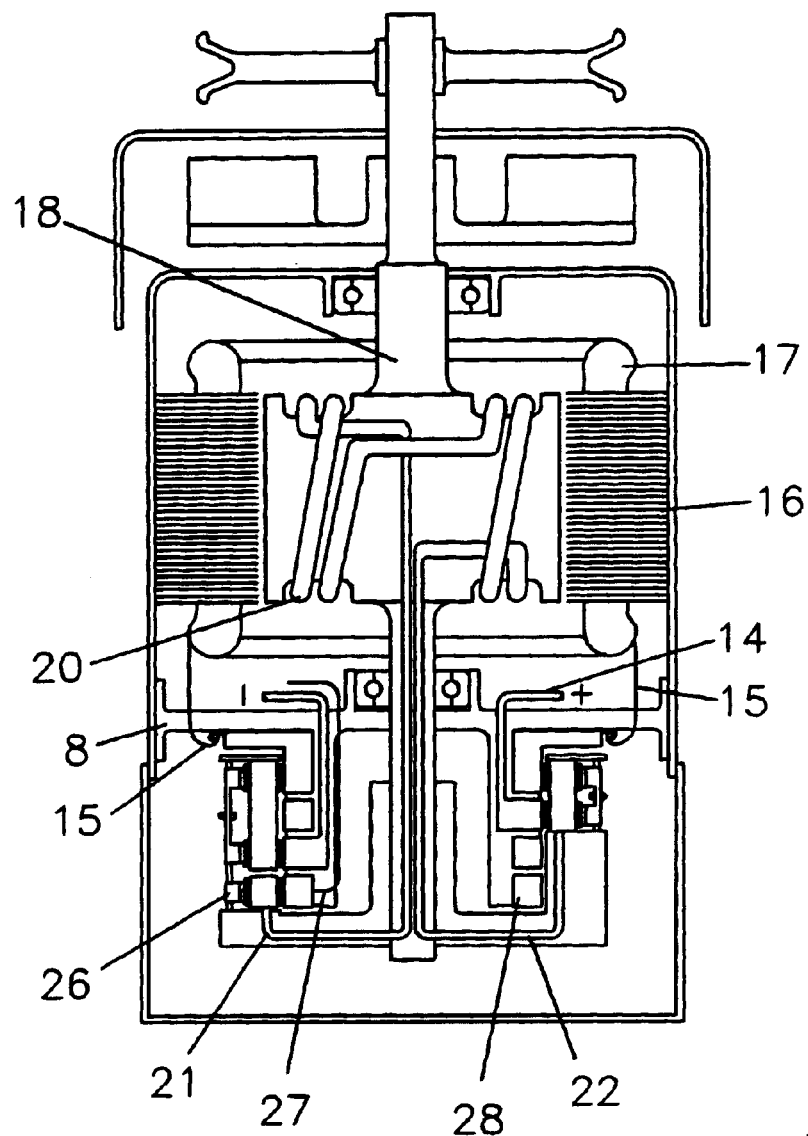
FIG. 11 shows the side view of the stationary armature machine in a separately excited configuration.

FIG. 10 shows the side view of the permanent magnet variation of the stationary armature machine whereas the permanent magnet having characteristics similar to that of said shunt wound machines. FIG. 11 shows the side view of the separately excited shunt wound stationary armature motor having a third regulating stationary slip ring FIG. 11-28 as a means for providing regulated current flow through lead FIG. 11-27 to said field structure from an external regulator. FIG. 11-26 shows a non-conductive brush keeper and copper brush holder isolated from the adjacent brush and holder as a means for conducting electric current from said regulating slip ring through lead FIG. 11-21 to said rotating field.

Figure 12:
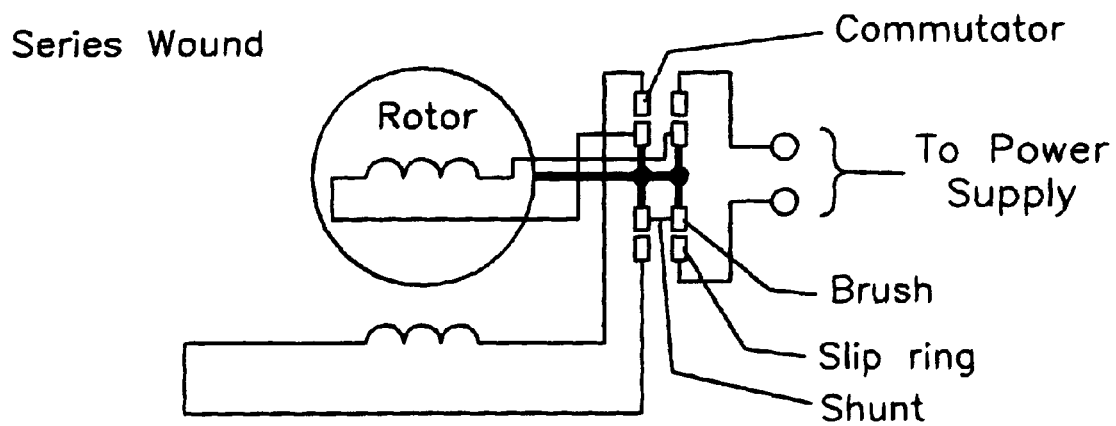
FIGS. 12 through 15 show schematic representations of the series wound, shunt wound, permanent magnet and separated excited machines.

Electric current continues to flow through said stationary commutator segment to the opposite rotating brush assemble. Said non-conductive brush keeper isolates the flow of electric current from said regulating source and said power source while the opposite rotating brush assembly having a shunt brush keeper such that the electric current flows from said rotating field coils and stationary armature in a shunt electrical connection flowing out to the other terminal of said power source completing the circuit. FIG. 12 shows an electrical schematic representation of the stationary armature machine in said series wound connection wherein the same electric current from a power source flows through both the field coil and the armature such that torque is proportional to the square of the current. The series wound configuration is useful in applications that require high starting torque.

Figure 13:
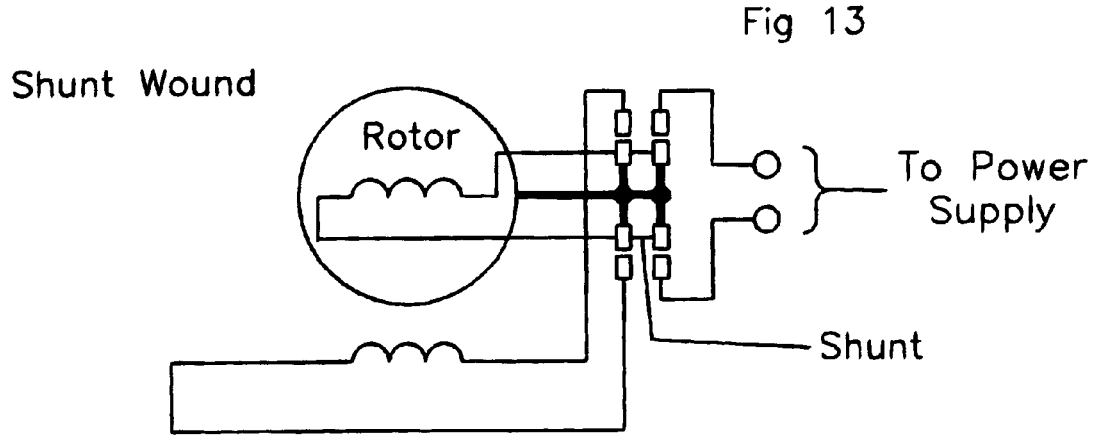

FIG. 13 shows an electrical schematic representation of the stationary armature machine in said shunt wound connection whereas the smaller part of the total electric current flows through the field coil which has a larger impedance and wherein the larger portion of the total current flows through the armature which has a much lower impedance such that torque is directly proportional to the current flowing through the armature. Said shunt wound configuration is useful in applications that require moderate torque and precise speed control.

Figure 14:
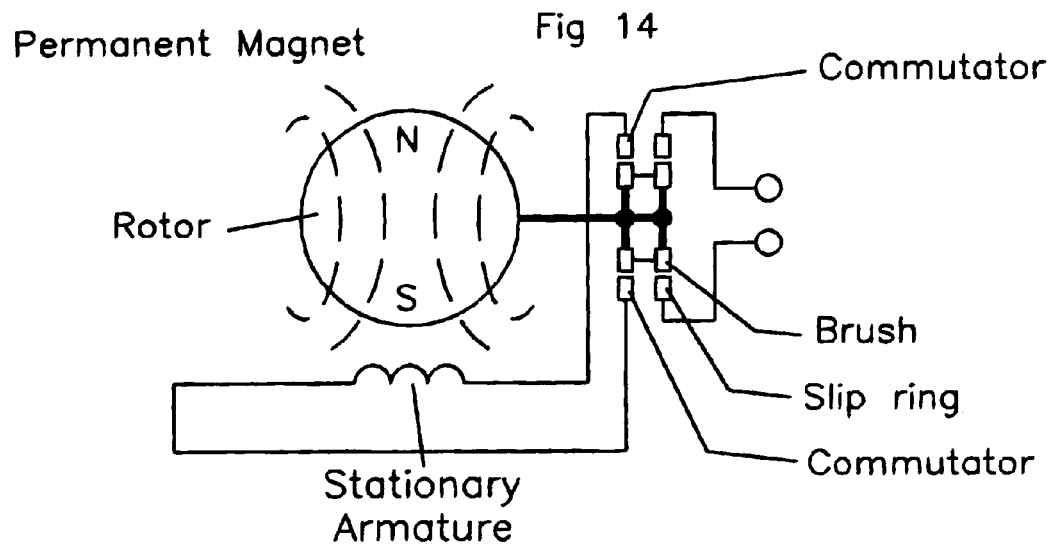
Figure 15:
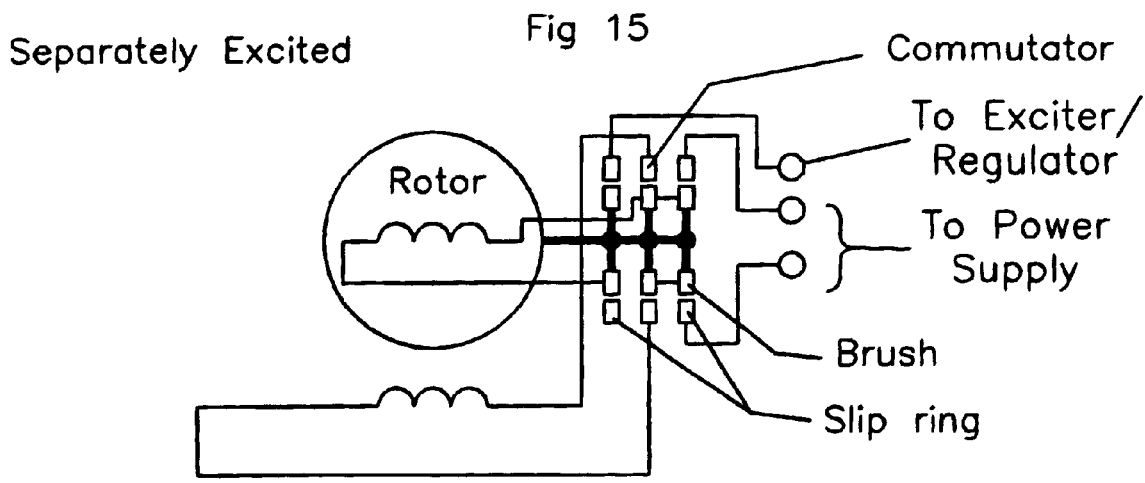

FIG. 14 shows an electrical schematic representation of the stationary armature machine whereas electric current flows through the stationary armature only. Said permanent magnet configuration is useful in applications that require bi-directional operation due to its ability to reverse the direction of rotation by reversing the polarity of the current flowing through the circuit. FIG. 15 shows an electrical schematic representation of the stationary armature machine in said separately excited configuration wherein the electric current flowing through the field coil is regulated by means of an external exciter. The current circuit is completed through a shunt electrical connection between said stationary armature and rotating field coil. Said separately excited configuration is useful in applications that require high torque, precise speed control, induced voltage regulation and bi-directional operation.

What is claimed is:

1. I claim a stationary armature self commutating machine comprising: (a) a stationary armature including multiple sets of lap or wave windings connected in series having multiple taps each attached to one stationary commutator segment; (b) a rotor comprised of a coil or a permanent magnet as a means for inducing a steady state magnetic field encompassed by said stationary armature; (c) a rotating brush assembly being affixed to said rotor and comprising a plurality of brushes arranged in sub-assemblies held in place by a non-conducting support base; (d) a first and second sub-assembly each consisting of at least two brushes, two copper brush holders; (e) a one brush keeper having a curved surface at one end contacting the top of each brush, a counter weight at the opposite end counteracting the centrifugal forces occasioned by said brushes, and forming a shunt being said two brushes; (f) fulcrum situated at said brush keeper's center of gravity and attached to said non-conducting support base, having equal and opposite moments occasioned by said brushes and counterweight providing a predetermined range of yaw within the sub-assembly's plane of rotations; (g) and a retaining spring as means for containing the brushes within said copper brush holder; (h) a first slip ring electrically connected to said first rotating sub-assembly's such that current flows through first brush, brush holder, and brush keeper with said stationary commutator and armature providing electrical continuity through the second brush holder and brush with some current flow being shunted around said armature through wires connected to the brush holder of a second rotating brush sub-assembly of opposite polarity forming a parallel or shunt electrical circuit.

2. The machine in claim 1 whereas first rotating brush sub-assembly comprised of two copper brush holders being electrically insulated from each other, having a non-conducting brush keeper being curved at one end and held together at the other end via a non-conducting counter-weight with limited range of yaw about a pin forming a fulcrum at its center of gravity affixed to said rotating base such that current flows from said first stationary slip ring, contacting said rotating brush and brush holder through said rotating field winding to said sub-assembly's second brush holder, brush, commutator and armature; whereby a second sub-assembly of opposite polarity being comprised of a conducting brush keeper and two electrically shunted brush holders such that current flows from said armature and commutator to said sub-assembly's first brush, brush holder and keeper, to said second brush holder, brush and slip ring of opposite polarity forming a series electrical connection between the rotating field and armature windings.

3. The machine in claim 1 whereas said first rotating brush sub-assembly comprised of a non-conducting brush keeper three brushes, and three copper brush holders having the first and second copper brush holders shunted together and electrically insulated from the third such that current flows from said first stationary slip ring, contacting said first rotating brush and brush holder through said rotating field winding in a parallel electrical connection with said stationary commutator and armature; whereby current flows though said rotating field winding to said third brush holder, brush and a third stationary slip ring electrically connected to an outside regulator as a means for separate excitation and regulation; whereby said second sub-assembly of opposite polarity being comprised of a conducting brush keeper and two electrically shunted brush holders such that current flows from said armature and commutator to said sub-assembly's first brush, brush holder and keeper, to said second brush holder, brush and second slip ring of opposite polarity.

4. The machine in one of claims 1, 2 & 3 wherein said rotating brush assembly's brushes electrically contact the outer flat or conical surface of the stationary commutator and slip rings arranged in a concentric pattern such that said brushes travel in a direction parallel to the plane of rotation and perpendicular to the point of contact between said stationary commutator and rotating brushes eliminating the need for counter weights.

* * * * *